United States Patent [19]

Shiomi

[11] Patent Number: 5,229,603
[45] Date of Patent: Jul. 20, 1993

[54] VIBRATION DETECTION APPARATUS

[75] Inventor: Yasuhiko Shiomi, Yokohama, Japan

[73] Assignee: Canon Kabushiki Kaisha, Tokyo, Japan

[21] Appl. No.: 738,112

[22] Filed: Jul. 30, 1991

[30] Foreign Application Priority Data

Jul. 31, 1990 [JP] Japan .................................. 2-201183
Jul. 31, 1990 [JP] Japan .................................. 2-201184

[51] Int. Cl.$^5$ .............................................. G01D 5/34
[52] U.S. Cl. .................... 250/231.1; 250/230; 73/655
[58] Field of Search ............ 250/231.1, 239, 230; 73/653, 655, 666, 650, 658

[56] References Cited

U.S. PATENT DOCUMENTS 4,649,748 3/1987 Fukano et al. .................... 73/653
4,792,931 12/1988 Nishida et al. .................... 250/231.1

Primary Examiner—David C. Nelms
Attorney, Agent, or Firm—Fitzpatrick, Cella, Harper & Scinto

[57] ABSTRACT

A vibration detection apparatus having an outer cylinder having a chamber in which a liquid is sealed, a movable member rotatably held about a predetermined rotating shaft, and detecting means for detecting a relative angular displacement of the movable member and the outer cylinder about the rotating shaft as a vibration signal, includes an electromagnetic means for controlling the relative angular displacement between the movable member and the outer cylinder, and a control means for nonlinearly changing the electromagnetic force of the electromagnetic means in accordance with the relative angular displacement between the movable member and the outer cylinder.

43 Claims, 11 Drawing Sheets

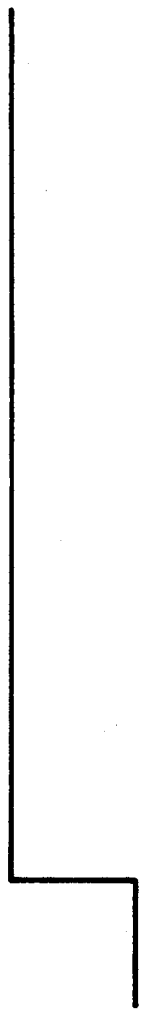
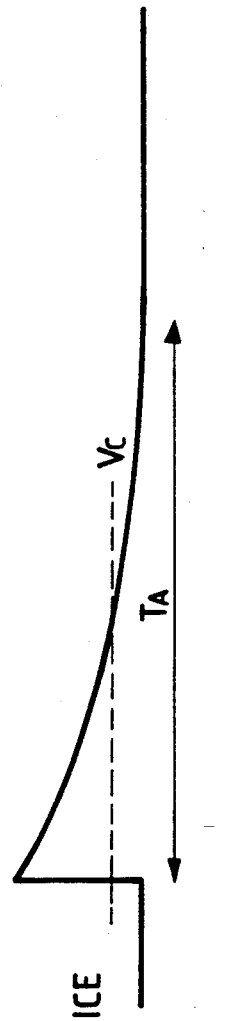
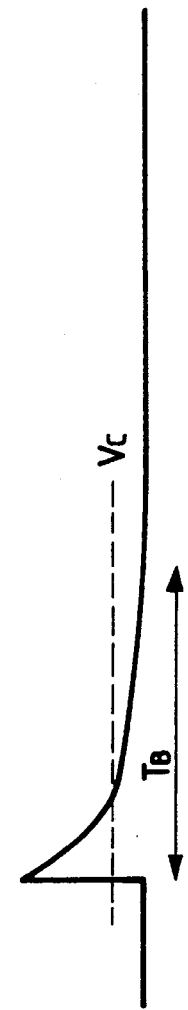
FIG. 7A  INPUT HAND VIBRATION SIGNAL
FIG. 7B  OUTPUT SIGNAL IN CONVENTIONAL DEVICE
FIG. 7C  OUTPUT SIGNAL IN 4th EMBODIMENT

VIBRATION DETECTION APPARATUS

BACKGROUND OF THE INVENTION

1. Field of the Invention

The present invention relates to a vibration detection apparatus for detecting a hand vibration or the like in a camera.

2. Related Background Art

An anti-vibration apparatus for a camera for preventing an image blur caused by a hand vibration or the like by using the above vibration detection apparatus is proposed in U.S. Pat. No. 5,126,561 issued Jun. 30, 1992 or the like A schematic arrangement of a stabilizing apparatus of this type is shown in FIG. 11.

Referring to FIG. 11, a buoyant member 2 made of a magnetic member supported around a predetermined rotating shaft 3 is arranged in an outer cylinder 1 in which a liquid is sealed. A permanent magnet 4 for maintaining the buoyant member 2 at a reference position is arranged around the outer cylinder 1 so as to constitute a magnetic circuit together with the buoyant member 2. In this state, when the outer cylinder 1 integrally formed with a camera is rotated by $\theta$IN by a hand vibration in an absolute space, the buoyant member 2 keeps a stationary state in the absolute space due to the inertia of the liquid in the outer cylinder 1, and the buoyant member 2 is rotated relative to the outer cylinder 1. A rotation amount of the buoyant member 2 from the reference position can be optically detected by a light-emitting element 5 rotated together with the camera and a light-receiving element 6 arranged such that the ratio of its two outputs is changed with a change in light incident position. As a result, an output corresponding to a rotational angle from the reference position is generated by a sensor control circuit 13. Note that elements from the outer cylinder 1 to the light-receiving element 6 and the sensor control circuit 13 correspond to an angular displacement detection apparatus serving as a vibration detection apparatus.

On the other hand, a known variable vertex angle prism 9 is used as an optical means for correcting the image blur. A liquid having a predetermined refractive index is sealed inside the vertical vertex angle prism 9. In addition, as shown in FIG. 11, the vibration detection apparatus is extendible about the rotating shaft shown in FIG. 11. When an incident plane on the object side (right side in FIG. 11) of the variable vertex angle prism 9 is rotated by $\theta$OUT with respect to a parallel position, an optical path of a beam incident on a film surface 12 through a photographic lens 11 is proportional to the angle $\theta$OUT and at the same time is rotated about an optical axis by an amount corresponding to a proportional constant determined by the refractive index of the liquid.

When an angular displacement in the absolute space is detected by the sensor (i.e., the light-emitting and light-receiving elements 5 and 6), and the vertex angle of the variable vertex angle prism 9 is changed by an amount corresponding to this angular displacement, light from an object is always incident on the same position of the film surface 12, thereby suppressing a hand vibration.

The vertex angle of the variable vertex angle prism 9 is optically detected by a light-emitting element 7 and a light-receiving element 8 in FIG. 11 as in the above angular displacement detection, and as a result, an angular output corresponding to the vertex angle is generated by a position detection circuit 14. Note that an output corresponding to a unit incident angle and generated by the sensor control circuit 13 is equal to an output corresponding to a unit angle of the optical axis and generated by the position detection circuit 14. The outputs from the sensor control circuit 13 and the position detection circuit 14 are input to a subtraction circuit 15 and are subtracted from each other. The difference from the subtraction circuit 15 is amplified by an amplifier 16. The amplified signal is phase-compensated by a phase compensator 17 so as to prevent oscillation of an actuator system loop. In addition, an output from the phase compensator 17 is input to a driver 18. A current is supplied from the driver 18 to an actuator 10 to drive the variable vertex angle prism 9.

With the above arrangement, feedback control is performed such that the output from the sensor control circuit 13 is set equal to that from the position detection circuit 14. In response to a detected hand vibration amount, the photographic optical system can be accurately corrected with respect to the optical axis, i.e., an image blur can be prevented.

In the above conventional arrangement, the buoyant member 2 is kept at the reference position of the outer cylinder 1 by a closed magnetic circuit constituted by the buoyant member 2 and the permanent magnet 4. A force of this closed magnetic circuit acts on the buoyant member 2 as a spring force around the rotating shaft 3, and the characteristics of this force are determined by the magnetic circuit. A vibration stabilizing effect up to a lower frequency level can be obtained when the buoyant member 2 is kept stationary in the absolute space in response to a vibration signal having a low frequency. For this purpose, a magnetic force of the closed magnetic circuit is decreased, and the buoyant member 2 is set not to follow movement of the outer cylinder 1. That is, a spring constant of the spring force must be set small.

When sensor performance is extended to the lower frequency side, rise characteristics are degraded due to a small spring force. For example, when a camera pointing position is abruptly changed as in panning, a large force acts on the sensor itself, and a relative position between the outer cylinder 1 and the buoyant member 2 is greatly changed. A force for returning the buoyant member 2 to the reference position is only the spring force and a viscous force of the liquid. When this spring force is small, a long stabilizing time is required. A vibration stabilizing function does not work until the buoyant member 2 is returned to the reference position. When a photographic operation using a vibration stabilizing function is to be performed, a shutter time lag is undesirably prolonged.

SUMMARY OF THE INVENTION

The present invention has been made in consideration of the above situation, and has its object to provide a vibration detection apparatus having an outer cylinder having a chamber in which a liquid is sealed, a movable member located in the sealed liquid in the outer cylinder and rotatably held around a predetermined rotating shaft, and detecting means for detecting a relative angular displacement of the movable member and the outer cylinder around the rotating shaft as a vibration signal, comprising electromagnetic means for controlling the relative angular displacement between the movable member and the outer cylinder in accordance with an electromagnetic force, and control means for nonlinearly changing the electromagnetic force of the electromagnetic means in accordance with the relative displacement between the movable member and the outer cylinder, wherein spring and viscous forces acting between the movable member and the outer cylinder are optimally changed in accordance with the nonlinear electromagnetic force for the relative angular displacement, thereby improving both the vibration detection characteristics themselves and vibration detection rise characteristics.

The above and other objects, features, and advantages of the present invention will be apparent from the following detailed description of the preferred embodiments in conjunction with the accompanying drawings.

BRIEF DESCRIPTION OF THE DRAWINGS

FIGS. 7A to 7C are timing charts of signal outputs in the fourth embodiment;

DETAILED DESCRIPTION OF THE PREFERRED EMBODIMENTS

Preferred embodiments of the present invention will be described with reference to the accompanying drawings hereinafter.

Figure 1:
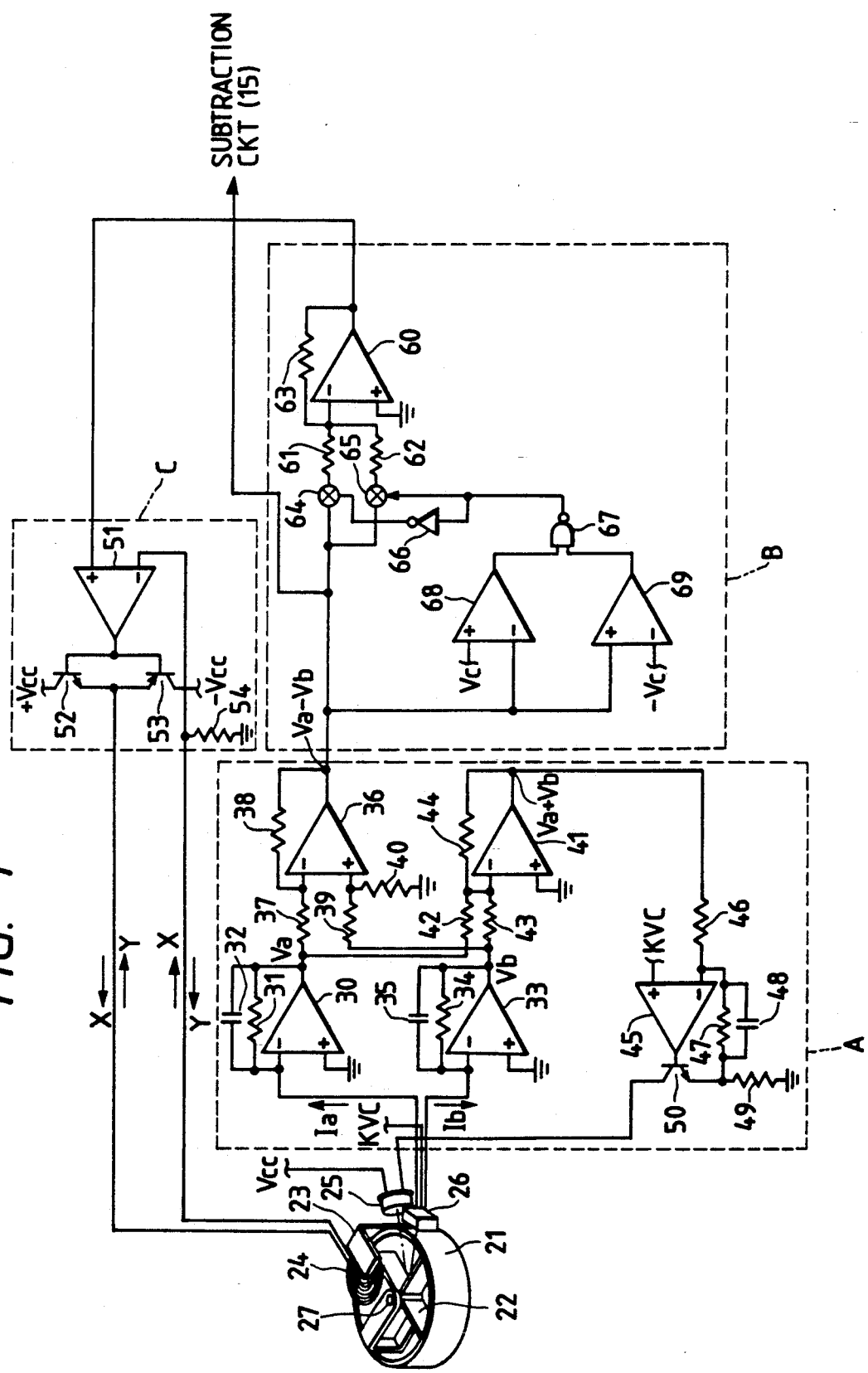
FIG. 1 is a diagram showing the first embodiment of the present invention.

FIG. 1 shows the first embodiment of the present invention. In this embodiment, an angular displacement detection apparatus serving as a vibration detection apparatus is expressed as a combination of a mechanical structure and an electrical arrangement.

The mechanical structure will be described first.

A liquid is filled inside an outer cylinder 21, and a buoyant member 22 having magnetic characteristics is supported in the liquid to be rotatable about a rotating shaft 27. A light-emitting element 25 and a light-receiving element 26 which cooperate to optically detect movement of the buoyant member 22 are arranged as shown in FIG. 1. A yoke 23 constitutes a closed magnetic circuit together with the buoyant member 22, and a coil 24 is arranged between the yoke 23 and the buoyant member 22.

The electrical arrangement of this embodiment will be described next.

A portion A surrounded by a broken line is a position detection unit for detecting the position of the buoyant member 22 relative to the outer cylinder 21. The position detection unit is a basic arrangement for causing the position detection light-receiving element 26 to detect an infrared beam emitted from the light-emitting element 25 and reflected by the buoyant member 22. Photocurrents Ia and Ib generated by the light-receiving element 26 are shunted in accordance with a gravitational position of the infrared beam incident on the light-receiving element 26 in a known manner. The photocurrents Ia and Ib are converted into voltages Va and Vb by a current-voltage converter constituted by an operational amplifier 30, a resistor 31, and a capacitor 32, and a current-voltage converter constituted by an operational amplifier 33, a resistor 34, and a capacitor 35, respectively. These voltages Va and Vb are input to a differential amplifier constituted by an operational amplifier 36 and resistors 37, 38, 39, and 40. This differential amplifier outputs a difference signal (Va−Vb). At the same time, the voltages Va and Vb are input to an addition amplifier constituted by an operational amplifier 41 and resistors 42, 43, and 44. This addition amplifier outputs a sum signal (Va+Vb).

The sum signal (Va+Vb) is input to the inverting input terminal of an operational amplifier 45 through a resistor 46. A constant current type iRED driver circuit constituted by the operational amplifier 45, a feedback resistor 47, a current value detection resistor 49, and a transistor 50 variably controls a current supplied to a light-emitting element 25 in accordance with the sum signal (Va+Vb). As a result, negative feedback control is performed such that the sum signal (Va+Vb) becomes equal to a reference voltage KVC applied to the noninverting input terminal of the operational amplifier 45. Note that a capacitor 48 is used to perform phase compensation for preventing oscillation of the feedback system and determines the total bandwidth together with the resistor 47.

As described above, when photocurrents generated by the light-receiving element 26 are always kept constant, displacement positions of the outer cylinder 21 and the buoyant member 22 from the reference position can be detected without receiving influences of changes in temperature and element variations, in accordance with the difference signal (Va−Vb) based on the two output signals from the light-receiving element 26.

Figure 11:
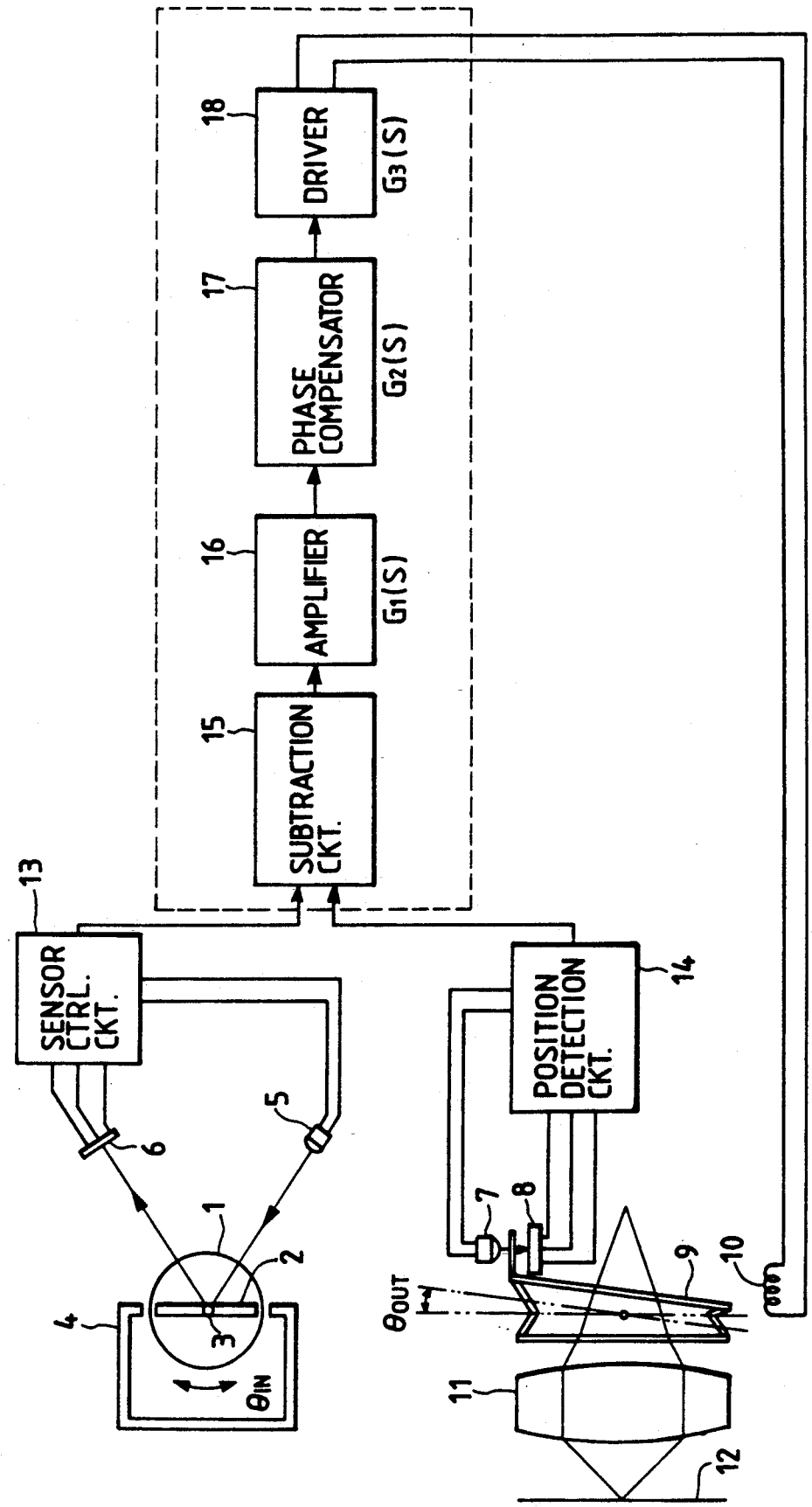
FIG. 11 is a schematic view showing a camera vibration stabilizing apparatus having a conventional vibration detection device.

The difference signal (Va−Vb) is output to the subtraction circuit 15 and the like described with reference to FIG. 11, and a vibration stabilizing operation is performed.

A portion B surrounded by a broken line is an arithmetic control unit for changing parameters as sensor parameters in this embodiment. The difference signal (Va−Vb) output from the operational amplifier 36 is input to the inverting input terminal of an operational amplifier 60 through a selection switch 64 and a gain setting resistor 61 and to the inverting input terminal of the operational amplifier 60 through a selection switch 65 and a gain setting resistor 62. Note that the operational amplifier 60 serves as an inverting amplifier by means of a feedback resistor 63. An output from the operational amplifier 60 is input to a driver unit C (to be described later).

The difference signal (Va−Vb) from the operational amplifier 36 is input to the inverting input terminal of a comparator 68 and the noninverting input terminal of a comparator 69. Outputs from the comparators 68 and 69 serve as inputs to a NAND gate 67. Since a positive reference voltage Vc is input to the noninverting input terminal of the comparator 68 and a negative reference voltage −Vc is input to the inverting input terminal of the comparator 69, a window comparator is constituted by the comparators 68 and 69 and the NAND gate 67. More specifically, when the difference signal (Va−Vb) falls within the range of Vc to −Vc, an output from the NAND gate 67 is set at "L" level. When the difference signal (Va−Vb) becomes larger than Vc or smaller than −Vc, an output from the NAND gate 67 goes to "H" level. The output from the NAND gate 67 is input to the gate control terminal of the analog selection switch 65 and to the gate control terminal of the analog selection switch 64 through an inverter 66. When the difference signal (Va−Vb) falls within the range of Vc to −Vc, the analog switch 64 is turned on to select the resistor 61. Otherwise, the analog selection switch 65 is turned on to select the resistor 62.

In a driver unit C surrounded by a broken line, a push-pull type constant current circuit is constituted by an operational amplifier 51, transistors 52 and 53, and a current detection resistor 54. A current can be flowed in one of directions indicated by arrows X and Y in FIG. 1. Therefore, a current proportional to an output voltage of the operational amplifier 60 which is applied to the noninverting input terminal of the operational amplifier 51 is supplied to the coil 24.

In the above arrangement, a current proportional to the difference signal (Va−Vb) corresponding to the relative position between the outer cylinder 21 and the buoyant member 22 is supplied to the coil 24 to generate a force based on the left-hand rule in the closed magnetic path constituted by the buoyant member 22 and the yoke 23. Since this force is proportional to a current value of the coil 24, a force proportional to the value of a relative displacement between the outer cylinder 21 and the buoyant member 22 is generated.

The sensor characteristics of this embodiment will be described with reference to a transfer function of a frequency.

An input I(S) represents a displacement of the outer cylinder 21 in an absolute space. An output angular displacement O(S) detected by the sensor of this embodiment is represented by a relative relationship between the displacement R(S) of the buoyant member 22 in the absolute space and the input angular displacement I(S) as follows:

$$O(S) = I(S) - R(S) \tag{1}$$

The output angular displacement O(S) is a relative angular displacement between the outer cylinder 21 and the buoyant member 22. A viscous force $\eta s O(S)$ proportional to a relative velocity between the outer cylinder 21 and the buoyant member 22 is generated. On the other hand, if the width of the yoke 23 is infinite along the movement direction of the buoyant member 22, a spring force by the magnetic force of the buoyant member 22 itself is supposed not to be generated. In practice, since the width of the yoke 23 is finite, its force acts as a spring force KO(S) although it is very weak. In this embodiment, a current proportional to a relative displacement between the outer cylinder 21 and the buoyant member 22 is supplied to the coil 24 to generate a force according to the method described above, thereby generating a new spring force. In this case, a spring force KCLO(S) obtained by coil energization acts to increase the original spring force KO(S). An arbitrary spring force is generated by variably changing the values of the gain setting resistors 61 and 62.

When the above forces are assumed to act on the buoyant member 22, an angular displacement R(S) of the buoyant member 22 in the entire space is expressed by using an inertia moment J of the liquid sealed in the outer cylinder 21 as follows:

$$R(S) = \frac{1}{JS^2} (\eta s + K + KCL)O(S) \tag{2}$$

A transfer function of this embodiment is expressed using equations (1) and (2) described above:

$$\frac{O(S)}{I(S)} = \frac{JS^2}{JS^2 + \eta s + (K + KCL)} \tag{3}$$

Equation (3) represents a second-order high-pass filter characteristic curve. It is apparent that the frequency characteristics of this filter can be set variable if the spring force is electrically controlled.

Figure 2:
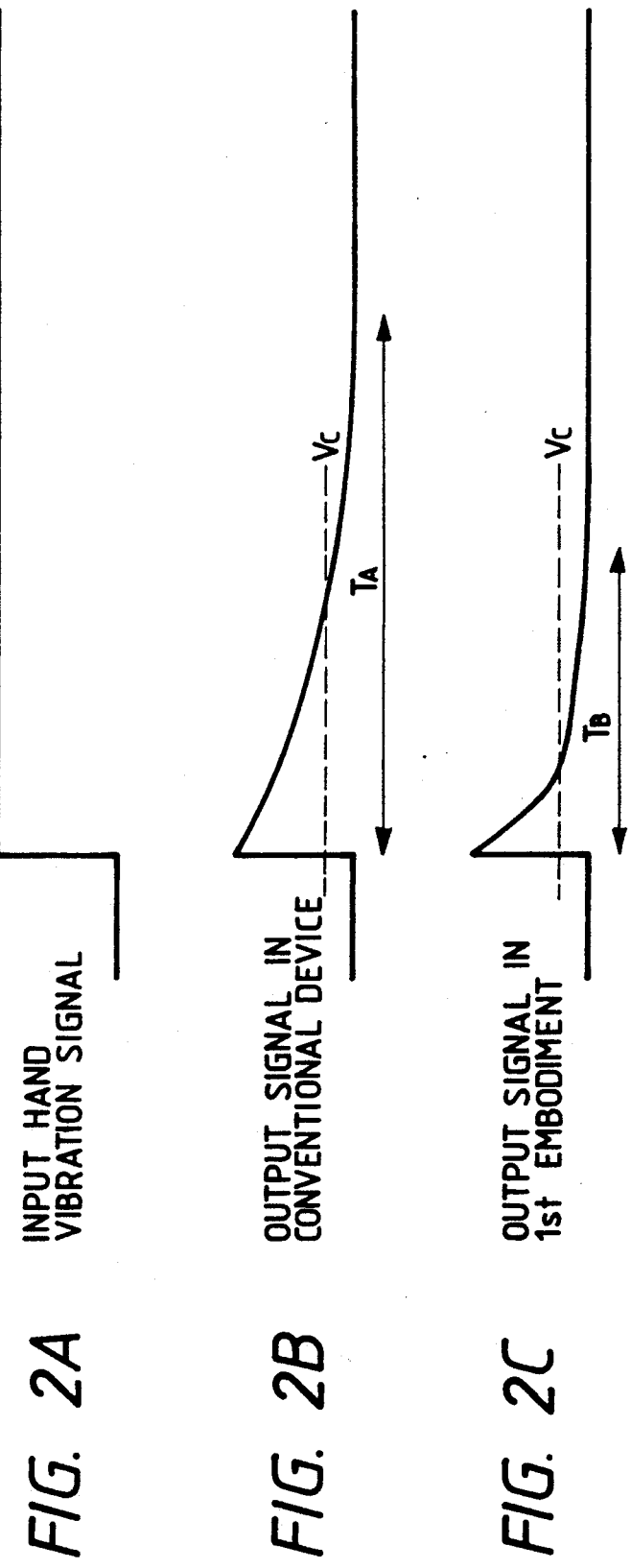
FIGS. 2A to 2C are timing charts for explaining signal outputs in the first embodiment.

FIGS. 2A to 2C are timing charts for explaining actual changes in signal outputs of this embodiment.

When a stepwise signal shown in FIG. 2A is input, since this sensor has second-order high-pass filter characteristics, as described above, a conventional signal output is changed following an input signal, and the output level comes close to the initial level in accordance with a time constant of the sensor, as shown in FIG. 2B. When the sensor capability for detecting a hand vibration is extended to the low frequency side, the stabilizing time TA is undesirably prolonged. FIG. 2C shows a signal output from the sensor of this embodiment. When a sensor output exceeds the reference level Vc (or −Vc) set in the unit in FIG. 1, i.e., when the buoyant member 22 is displaced from the outer cylinder 21 by a predetermined amount or more with respect to the reference position, the analog switch 64 is turned off and the analog switch 65 is turned on. The resistor 62 having a resistance smaller than that of the resistor 61 is selected, and the total gain is increased. As described above, the value of the spring constant KCL obtained upon coil energization is increased. When the sensor output is kept exceeding Vc (or −Vc), the spring constant is large, and therefore, the present level tends to come close to the initial level. Thereafter, when the sensor output becomes smaller than Vc (or −Vc), i.e., the displacement of the buoyant member 22 relative to the outer cylinder 21 falls within the predetermined amount, the original spring constant is restored. While the vibration stabilizing capacity of this embodiment is kept almost equal to a conventional capacity at a low-frequency level, the overall stabilizing time TB can be shorter than the stabilizing time TA. When a photographic operation using a vibration stabilizing function is to be performed, a shutter time lag can be shortened.

Figure 3:
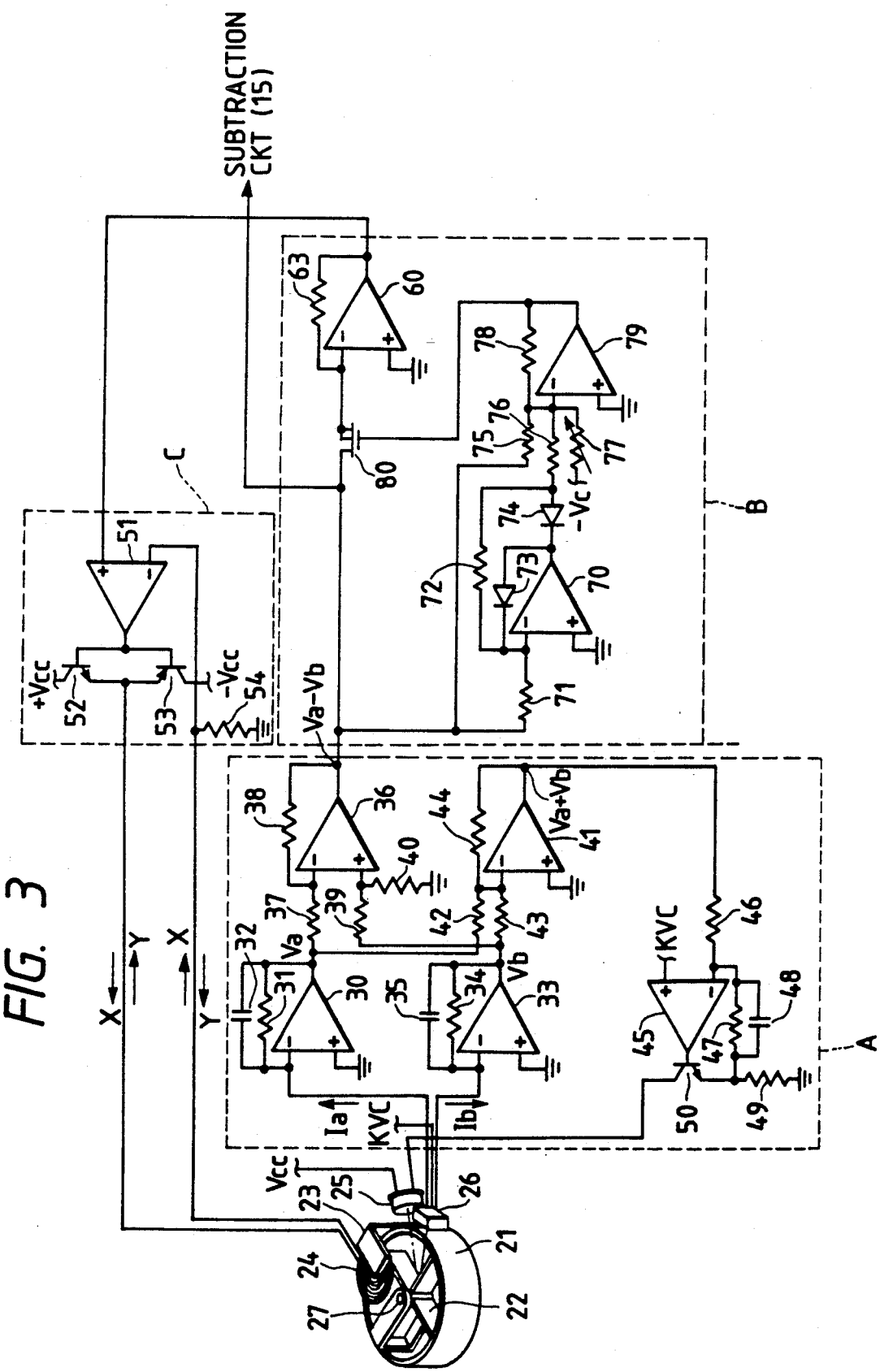
FIG. 3 is a diagram showing the second embodiment of the present invention.

FIG. 3 shows the second embodiment of the present invention. This embodiment has an arrangement for continuously changing a spring constant in accordance with an output level.

A position detection unit A and a driver unit C of the second embodiment are the same as those of the first embodiment. The same reference numerals as in the first embodiment denote the same parts in the second embodiment, and a detailed description thereof will be omitted (this applies to the subsequent embodiments).

An arithmetic control unit B shows a method of continuously changing a spring constant value in accordance with an input difference signal (Va−Vb) in practice.

An amplifier constituted by an operational amplifier 70, resistors 71 and 72, and diodes 73 and 74 is a known half-wave rectifying circuit. When the level of a difference signal (Va−Vb) is lower than a ground potential connected to the noninverting input terminal of the operational amplifier 70, the diode 73 is turned on and the diode 74 is turned off. The anode output of the diode 74 becomes equal to the ground potential. On the other hand, when the level of the difference signal (Va−Vb) is higher than the ground potential, the diode 73 is turned off, and the diode 74 is turned on. The anode output of the diode 74 becomes an inverted output of the difference signal (Va−Vb).

An adder constituted by an operational amplifier 79 and resistors 75, 76, 77, and 78 adds a difference signal (Va−Vb) and an output from the half-wave rectifying circuit, and additionally a negative reference voltage −Vc. The resistances of the resistors 71 and 72 are set equal to each other, and the ratio of the resistance of the resistor 75 to that of the resistor 76 is set to be 2:1, thereby forming a known absolute value circuit. The resistance of the variable resistor 77 is changed to change the DC bias level of the absolute value circuit.

Since an output from the absolute value circuit is input to the gate of an n-channel MOSFET 80 connected to the inverting input terminal of an operational amplifier 60, an equivalent source-drain path resistance is nonlinearly changed in accordance with an output from the absolute value circuit.

Since a feedback resistor 63 is connected to the operational amplifier 60, a gain determined by the equivalent resistance of the N-MOSFET 80 and the resistance value of the resistor 63 is changed in accordance with the difference signal (Va−Vb). That is, the spring constant is continuously increased in accordance with an increase in displacement of a buoyant member 22 relative to an outer cylinder 21.

Figure 4:
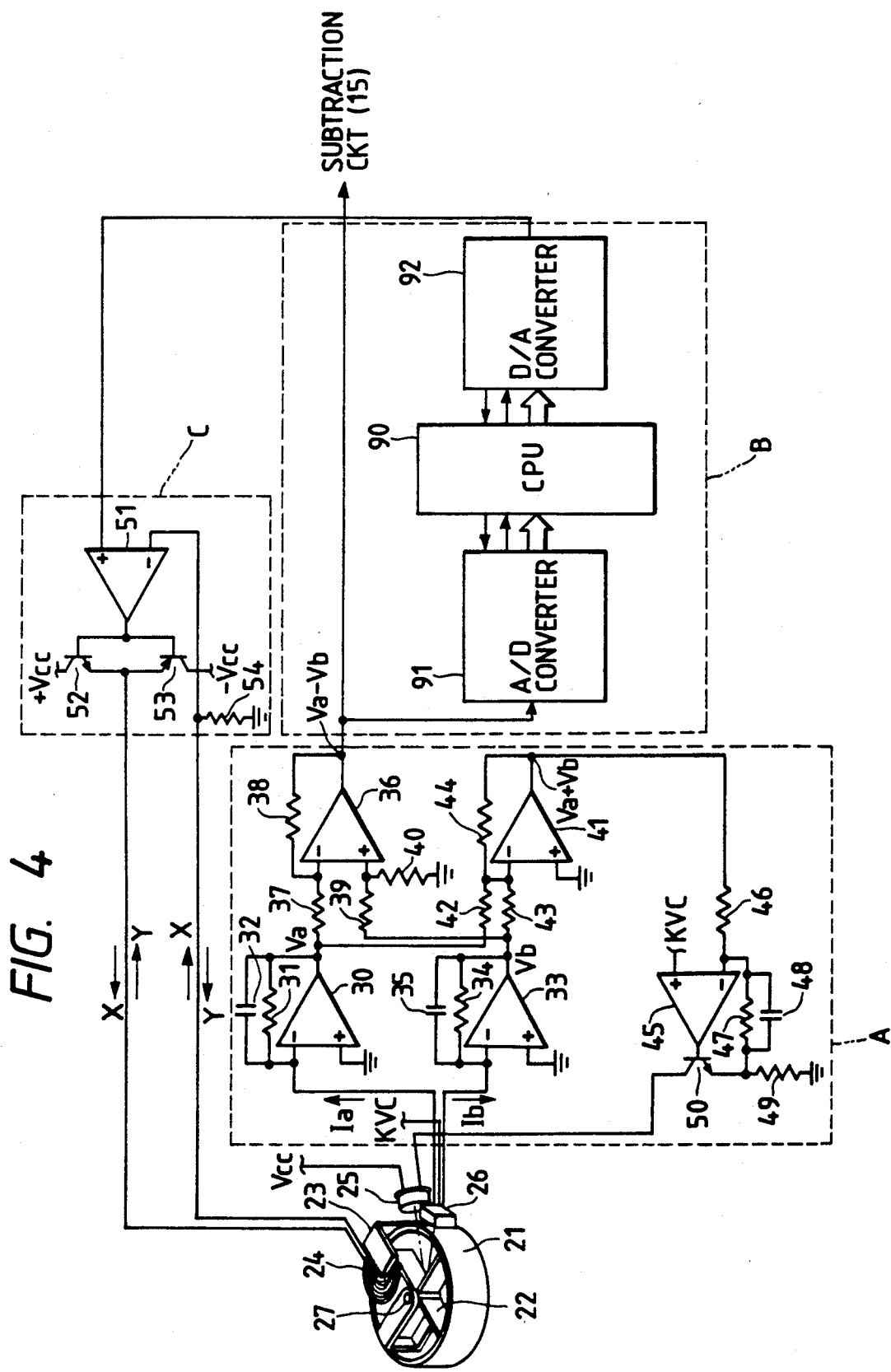
FIG. 4 is a diagram showing the third embodiment of the present invention.
Figure 5:
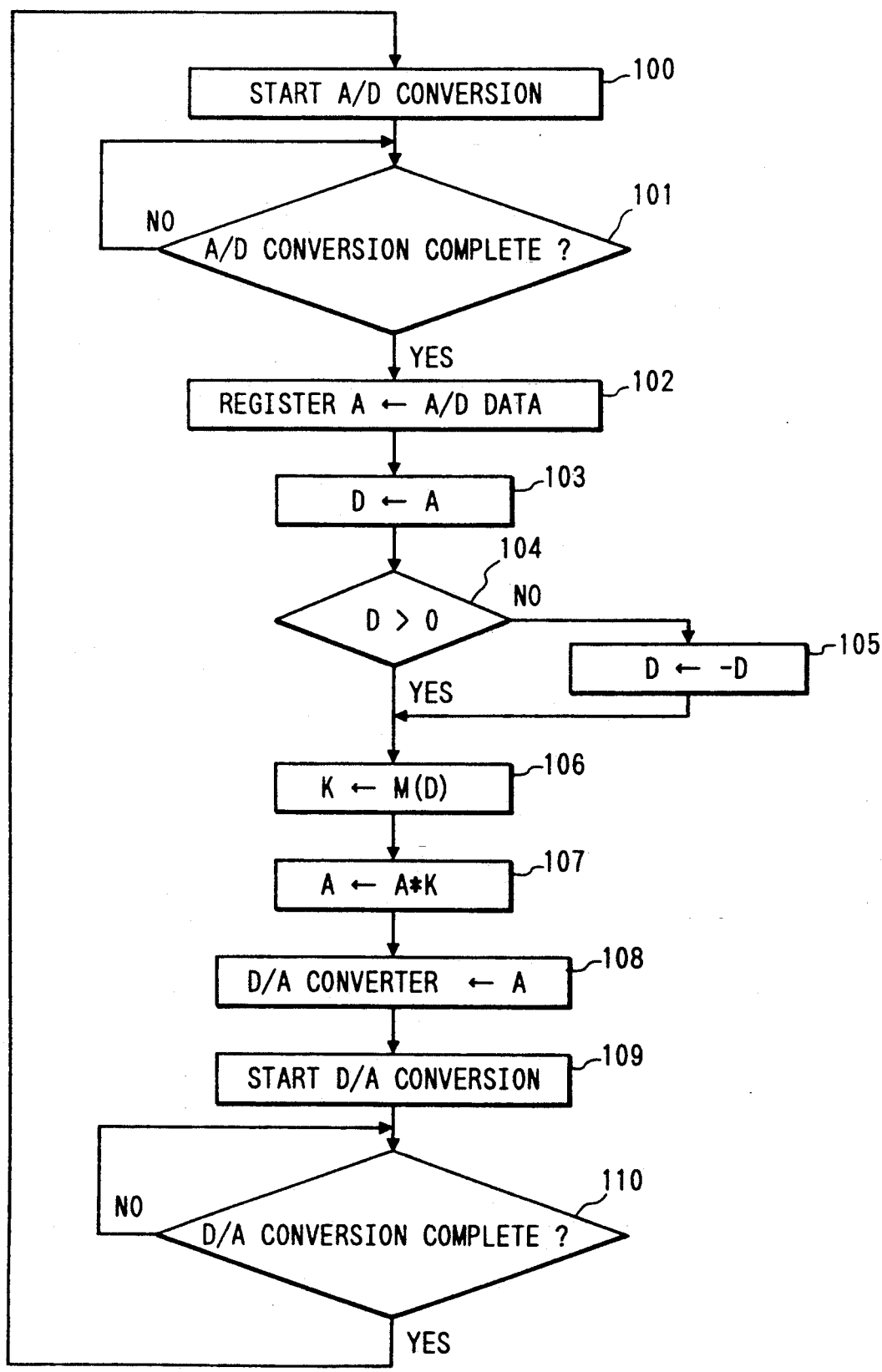
FIG. 5 is a flow chart showing an operation of the third embodiment.

FIG. 4 shows the third embodiment of the present invention which digitally changes a spring constant, and its flow chart is shown in FIG. 5.

A position detection unit A and a driver unit C are the same as those in the first and second embodiments.

An arithmetic control unit B performs digital control of this embodiment and comprises an A/D converter 91 for converting an input difference signal (Va−Vb) into digital data, a CPU 90 for performing overall arithmetic operations and state detection, and a D/A converter 92 for outputting analog data on the basis of data from the CPU 90.

An operation of this embodiment will be described with reference to FIG. 5.

In step 100, the A/D converter 91 starts A/D conversion of the difference signal (Va−Vb) as a relative displacement between an outer cylinder 21 and a buoyant member 22 in response to an A/D control signal from the CPU 90.

The CPU 90 determines in step 101 whether A/D conversion is completed. If YES in step 101, the flow advances to step 102. In step 102, an A/D conversion result from the A/D converter 91 is loaded in a register A in the CPU 90. In step 103, the value of the register A is also stored in a register D without any change. In step 104, it is determined whether the value of the register D is positive or negative. If the value is determined to be positive, the flow advances to step 106. If the value is determined to be negative, the sign is inverted and the inverted value is stored in the register D in step 105. The flow then advances to step 106. In step 106, memory data M(D) prestored in accordance with the value of the register D is transferred to a register K. The value of the memory data M(D) is set to be increased with an increase in the D value.

In step 107, the value, i.e., the A/D conversion result of the register A is multiplied with the value of the register K, and the product is stored in the register A. In step 108, this value of the register A is output to the D/A converter 92. In step 109, the D/A converter starts D/A conversion in response to a control signal input from the CPU 90. The CPU 90 determines in step 110 whether D/A conversion is completed. When D/A conversion is completed, the flow returns to step 100. Since the output from the D/A converter 92 is connected to an input section of the driver unit C, a current proportional to the output from the D/A converter 92 is supplied to a coil 24.

The value of the proportional coefficient applied to the driver unit C is selectively changed in accordance with the value of the difference signal (Va−Vb). That is, the spring constant of the sensor is increased in accordance with the sensor output (i.e., the difference signal (Va−Vb)). That is, the spring constant is increased when a relative displacement between the outer cylinder 21 and the buoyant member 22 is increased.

In each embodiment described above, a current proportional to the relative displacement between the buoyant member 22 and the outer cylinder 21 is supplied to the coil 24 to electrically generate a sensor spring force. This proportional constant is increased when the displacement output from the sensor is increased. The spring force of the sensor is nonlinearly and abruptly increased when the relative displacement between the outer cylinder 21 and the buoyant member 22 is increased. Therefore, the rise stabilizing time can be greatly shortened without degrading the sensor characteristics. This leads to an effect of shortening a camera shutter time lag.

Figure 6:
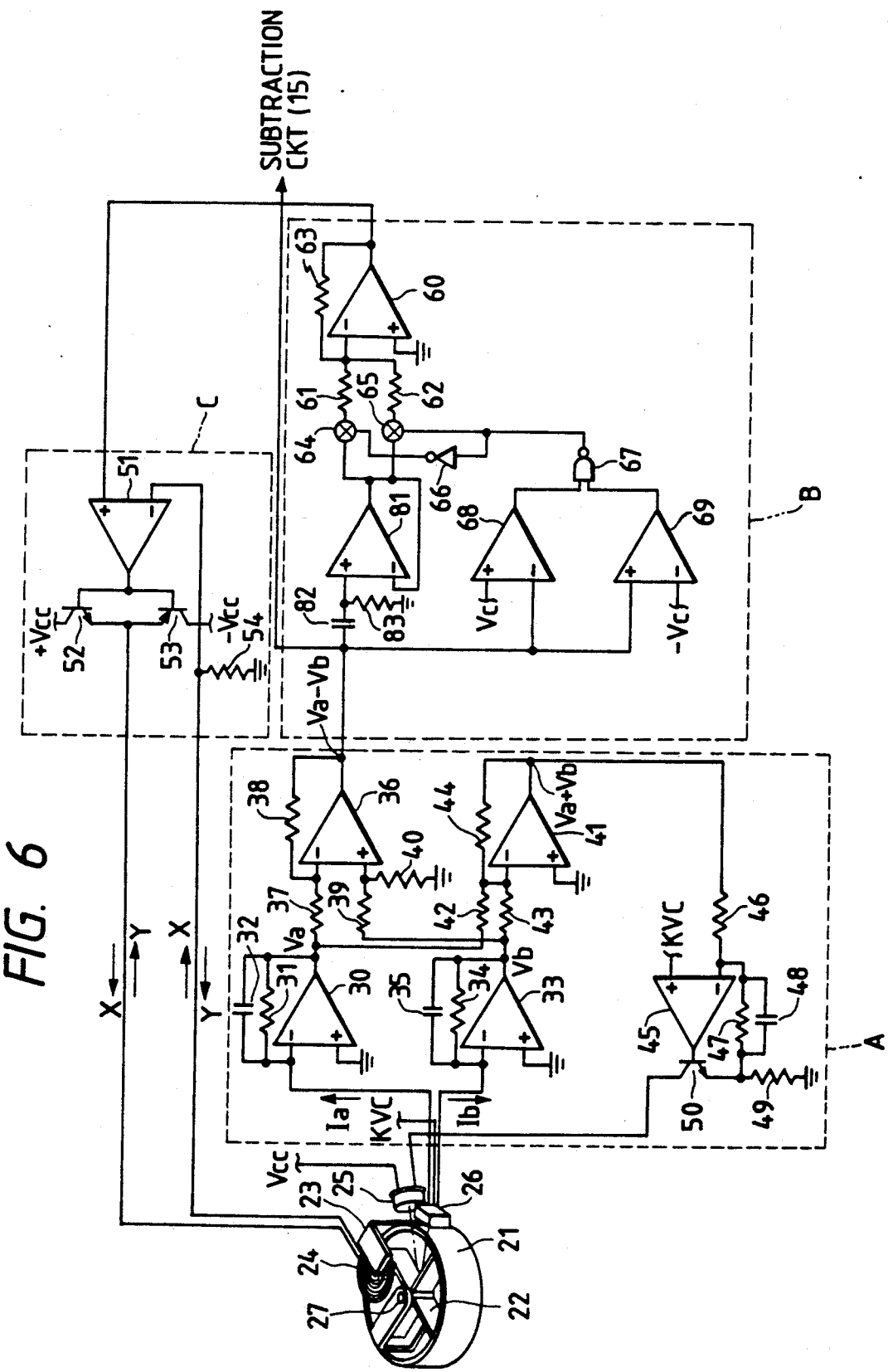
FIG. 6 is a diagram showing the fourth embodiment of the present invention.

FIG. 6 shows the fourth embodiment of the present invention. A position detection unit A and a driver unit C of this embodiment are the same as those of the first to third embodiments.

In an arithmetic control unit B, a difference signal (Va−Vb) output from an operational amplifier 36 is input to a differentiator constituted by an operational amplifier 81, a capacitor 82, and a resistor 83. An output from the differentiator is input to the inverting input terminal of an operational amplifier 60 through a selection switch 64 and a gain setting resistor 61 and to the inverting input terminal of the operational amplifier 60 through a selection switch 65 and a gain setting resistor 62. Note that the operation amplifier 60 serves as an inverting amplifier by means of a feedback resistor 63. An output from the operational amplifier 60 is input to the driver unit C (to be described in detail later).

The difference signal (Va−Vb) from the operational amplifier 36 is also supplied to the inverting input terminal of a comparator 68 and the noninverting input terminal of a comparator 69. Outputs from the comparators 68 and 69 are input to a NAND gate 67. A positive reference voltage Vc is input to the noninverting input terminal of the comparator 68, and a negative reference voltage −Vc is input to the inverting input terminal of the comparator 69. The comparators 68 and 69 and the NAND gate 67 constitute a window comparator. More specifically, when the difference signal (Va−Vb) falls within the range of Vc to −Vc, an output from the NAND gate 67 is set at "L" level. When the difference signal (Va−Vb) becomes larger than Vc or smaller than −Vc, an output from the NAND gate 67 goes to "H" level. The output from the NAND gate 67 is input to the gate control terminal of the analog selection switch 65 and to the gate control terminal of the analog selection switch 64 through an inverter 66. When the difference signal (Va−Vb) falls within the range of Vc to −Vc, the analog switch 64 is turned on to select the resistor 61. Otherwise, the analog selection switch 65 is turned on to select the resistor 62.

With the above arrangement, when a current proportional to a differential value of the difference signal (Va−Vb) corresponding to the relative position between the outer cylinder 21 and the buoyant member 22 is supplied to the coil 24, a force based on the left-hand rule in the closed magnetic path constituted by the buoyant member 22 and a yoke 23 is generated. Since this force is naturally proportional to a current value of the coil 24, a force proportional to the differential value of the relative displacement value between the outer cylinder 21 and the buoyant member 22 is generated.

The sensor characteristics of this embodiment will be described with reference to a transfer function of a frequency.

An input I(S) represents a displacement of the outer cylinder 21 in an absolute space. An output angular displacement 0(S) detected by the sensor of this embodiment is represented by a relative relationship between the displacement R(S) of the buoyant member 22 in the absolute space and the input angular displacement I(S) as follows:

$$O(S) = I(S) - R(S) \quad (4)$$

The output angular displacement 0(S) is a relative angular displacement between the outer cylinder 21 and the buoyant member 22. A viscous force $\eta s O(S)$ proportional to a relative velocity between the outer cylinder 21 and the buoyant member 22 is generated. On the other hand, if the width of the yoke 23 is infinite along the movement direction of the buoyant member 22, a spring force by the magnetic force of the buoyant member 22 itself is supposed not to be generated. In practice, since the width of the yoke 23 is finite, its force acts as a spring force KO(S) although it is very weak. In this embodiment, a current proportional to a differential value of a relative displacement between the outer cylinder 21 and the buoyant member 22 is supplied to the coil 24 to generate a force according to the method described above, thereby generating a new viscous force. In this case, a viscous force $\eta CLSO(S)$ obtained by coil energization acts to increase the original viscous force $\eta s O(S)$. An arbitrary viscous force is generated by variably changing the values of the gain setting resistors 61 and 62.

When the above forces are assumed to act on the buoyant member 22, an angular displacement R(S) of the buoyant member 22 in the entire space is expressed by using an inertia moment J of the liquid sealed in the outer cylinder 21 as follows:

$$R(S) = \frac{1}{JS^2} (\eta s + K + \eta CLS)O(S) \quad (5)$$

A transfer function of this embodiment is expressed using equations (4) and (5) described above:

$$\frac{O(S)}{I(S)} = \frac{JS^2}{JS^2 + (\eta + \eta CL)s + K} \quad (6)$$

Equation (6) represents a second-order high-pass filter characteristic curve. It is apparent that the frequency characteristics of this filter can be set variable if the viscous force is electrically controlled.

FIGS. 7A to 7C are timing charts for explaining actual changes in signal outputs of this embodiment.

When a stepwise signal shown in FIG. 7A is input, since this sensor has second-order high-pass filter characteristics, as described above, a conventional signal output is changed following an input signal, and the output level comes close to the initial level in accordance with a time constant of the sensor, as shown in FIG. 7B. When the sensor capability for detecting a hand vibration is extended to the low frequency side, the stabilizing time TA is undesirably prolonged. FIG. 7C shows a signal output from the sensor of this embodiment. When a sensor output exceeds the reference level Vc (or −Vc) set in the unit in FIG. 6, i.e., when the buoyant member 22 is displaced from the outer cylinder 21 by a predetermined amount or more with respect to the reference position, the analog switch 64 is turned off and the analog switch 65 is turned on. The resistor 62 having a resistance smaller than that of the resistor 61 is selected, and the total gain is increased. As described above, the value of the viscous constant $\eta CL$ obtained upon coil energization is increased. When the sensor output is kept exceeding Vc (or −Vc), the viscous constant is large, and therefore, the present level tends to come close to the initial level. Thereafter, when the sensor output becomes smaller than Vc (or −Vc), i.e., the displacement of the buoyant member 22 relative to the outer cylinder 21 falls within the predetermined amount, the original spring constant is restored. While the vibration stabilizing capacity of this embodiment is kept almost equal to a conventional capacity at a low-frequency level, an overall stabilizing time TB' can be shorter than the stabilizing time TA. When a photographic operation using a vibration stabilizing function is to be performed, a shutter time lag can be shortened.

Figure 8:
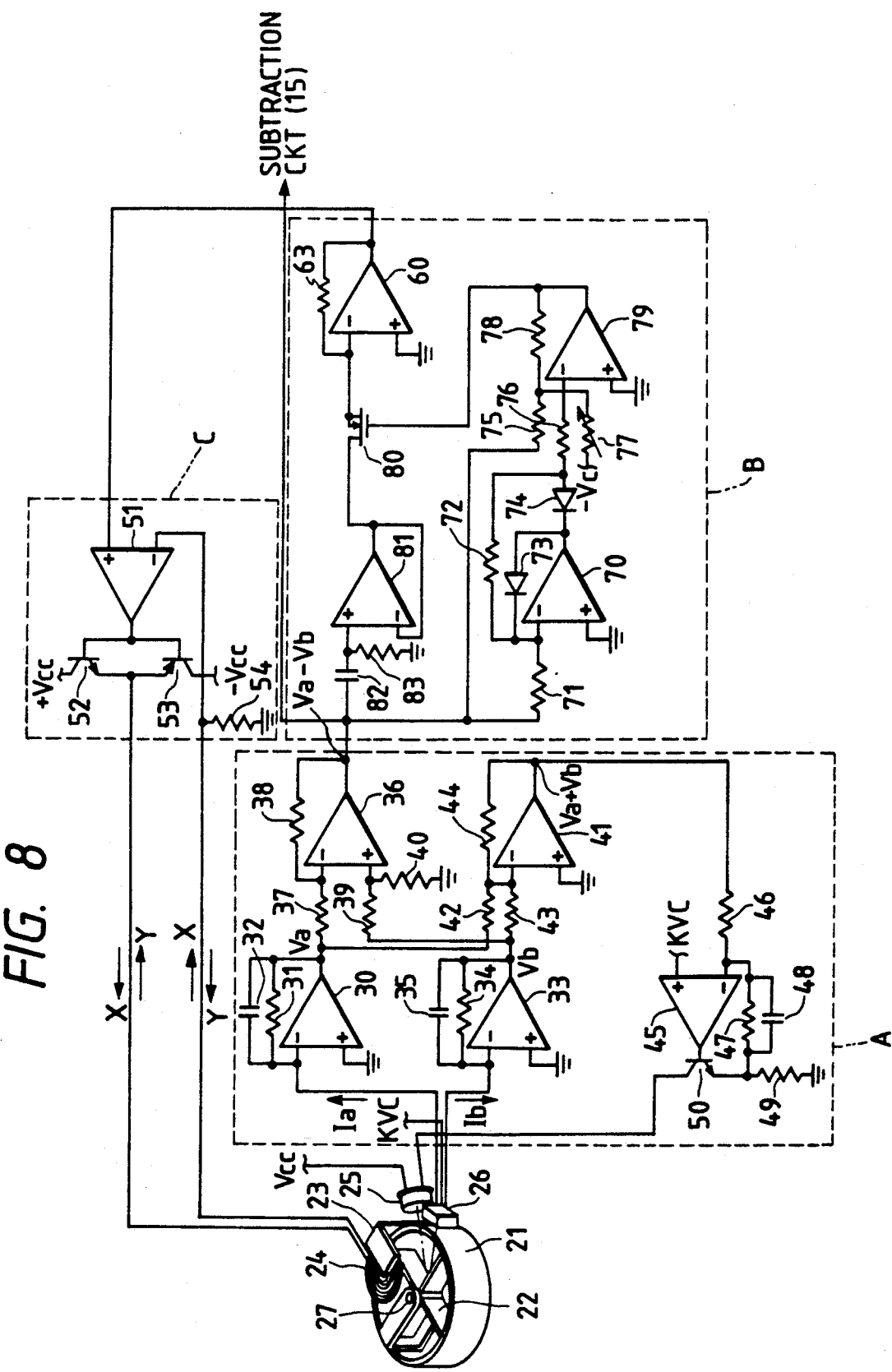
FIG. 8 is a diagram showing the fifth embodiment of the present invention.

FIG. 8 shows the fifth embodiment of the present invention. This embodiment has an arrangement for continuously changing a viscous constant in accordance with an output level.

A position detection unit A and a driver unit C of the fifth embodiment are the same as those of the first to fourth embodiments.

An arithmetic control unit B shows a method of continuously changing a viscous constant value in accordance with an input difference signal (Va−Vb) in practice.

An amplifier constituted by an operational amplifier 70, resistors 71 and 72, and diodes 73 and 74 is a known half-wave rectifying circuit. When the level of a difference signal (Va−Vb) is lower than a ground potential connected to the noninverting input terminal of the operational amplifier 70, the diode 73 is turned on and the diode 74 is turned off. The anode output of the diode 74 becomes equal to the ground potential. On the other hand, when the level of the difference signal (Va−Vb) is higher than the ground potential, the diode 73 is turned off, and the diode 74 is turned on. The anode output of the diode 74 becomes an inverted output of the difference signal (Va−Vb).

An adder constituted by an operational amplifier 79 and resistors 75, 76, 77, and 78 adds a difference signal (Va−Vb) and an output from the half-wave rectifying circuit, and additionally a negative reference voltage −Vc. The resistances of the resistors 71 and 72 are set equal to each other, and the ratio of the resistance of the resistor 75 to that of the resistor 76 is set to be 2:1, thereby forming a known absolute value circuit. The resistance of the variable resistor 77 is changed to change the DC bias level of the absolute value circuit.

Since an output from the absolute value circuit is input to the gate of an n-channel MOSFET 80 connected to the inverting input terminal of an operational amplifier 60, an equivalent source-drain path resistance is nonlinearly changed in accordance with an output from the absolute value circuit. In addition, the difference signal (Va−Vb) is input to the differentiator constituted by the operational amplifier 81, the capacitor 82, and the resistor 83. An output from the differentiator is input to the drain of the N-MOSFET 80. Since the feedback resistor 63 is connected to the operational amplifier 60, a gain determined by the equivalent resistance of the N-MOSFET 80 and the resistance of the resistor 63 is variably changed in accordance with the differential value of the difference signal (Va−Vb). That is, the viscous constant is continuously increased with an increase in the displacement of the buoyant member 22 relative to the outer cylinder 21.

Figure 9:
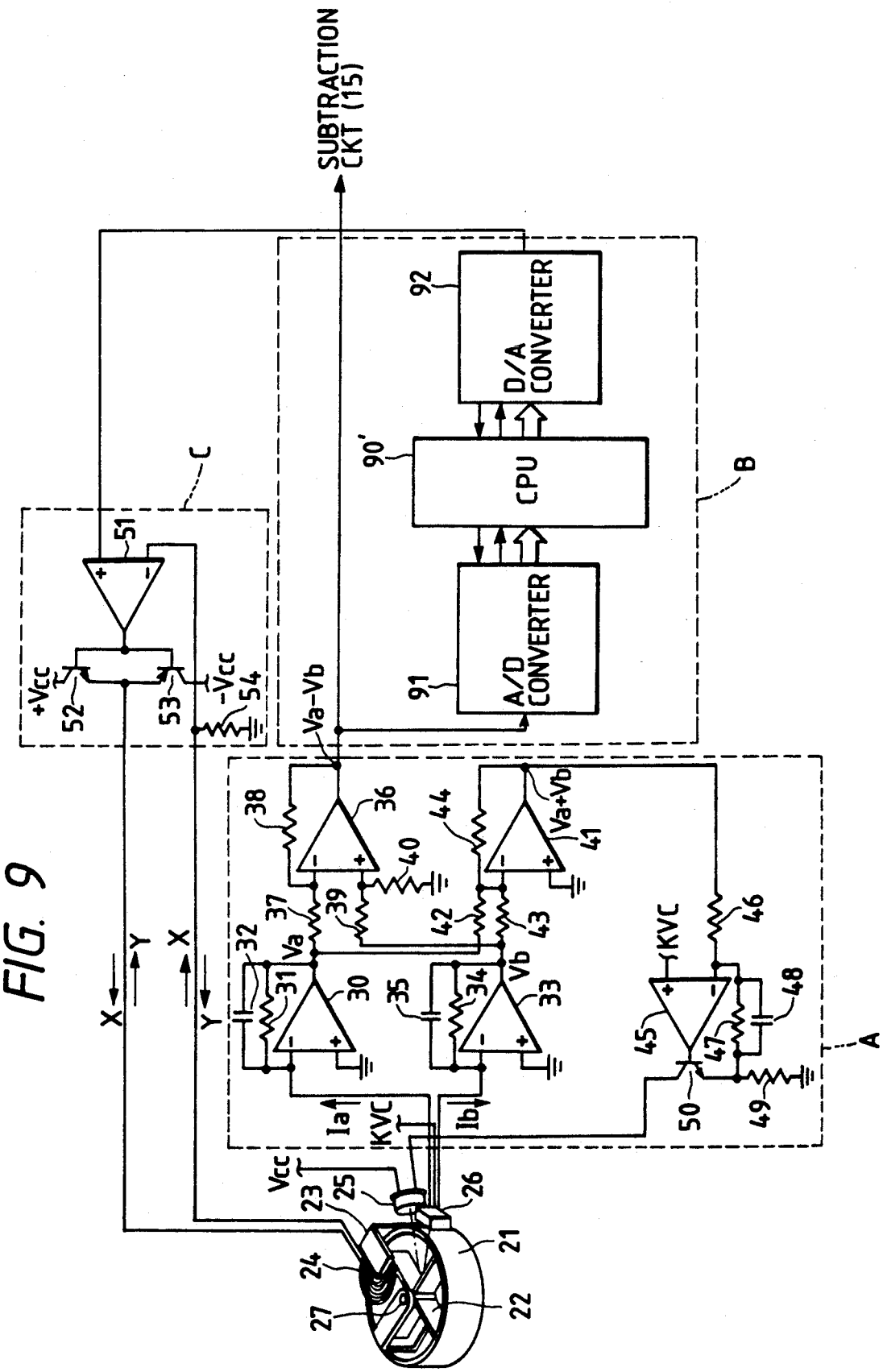
FIG. 9 is a diagram showing the sixth embodiment of the present invention.
Figure 10:
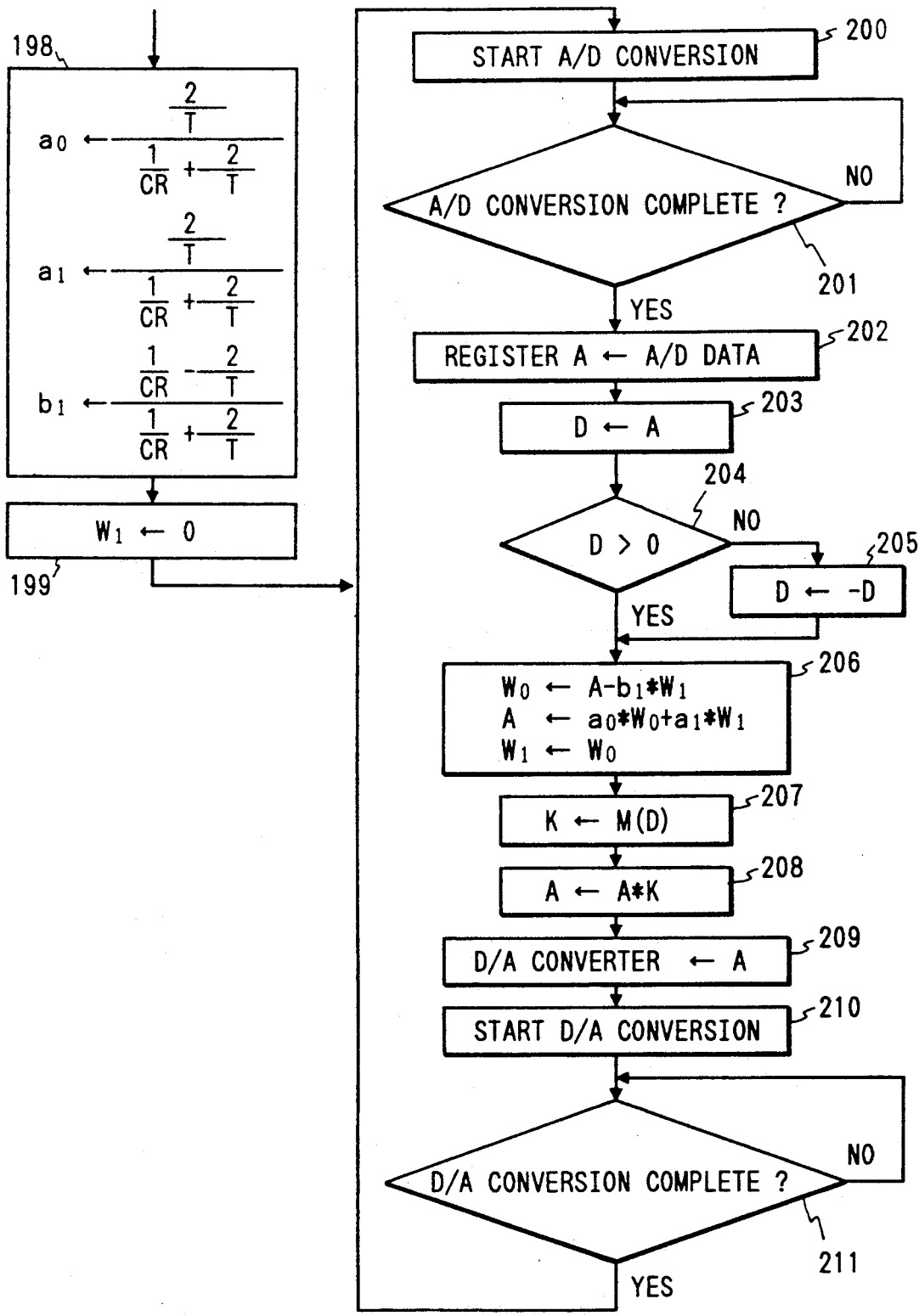
FIG. 10 is a flow chart showing an operation of the sixth embodiment of the present invention.

FIG. 9 shows the sixth embodiment of the present invention which digitally changes a viscous constant, and its flow chart is shown in FIG. 10.

A position detection unit A and a driver unit C are the same as those in the first to fifth embodiments.

An arithmetic control unit B performs digital control of this embodiment and comprises an A/D converter 91 for converting an input difference signal (Va−Vb) into digital data, a CPU 90' for performing overall arithmetic operations and state detection, and a D/A converter 92 for outputting analog data on the basis of data from the CPU 90'.

An operation of this embodiment will be described with reference to FIG. 10.

In step 198, constants are set in registers $a_0$, $a_1$, and $b_1$ for differential calculations. In this case, C corresponds a capacitance value of the capacitor 82 in FIG. 6, R corresponds to the resistance value of the resistor 83 in FIG. 6, and T represents a sampling time interval. The sampling time interval T is set by known S-Z conversion to convert data on the frequency axis into data on the time axis. In step 199, the value of a resistor $W_1$ used for calculations is reset to "0". In step 200, the A/D converter 91 starts A/D conversion of the difference signal (Va−Vb) as an output of the relative displacement between the outer cylinder 21 and the buoyant member 22 in accordance with an A/D control signal from the CPU 90'.

The CPU 90' determines in step 201 whether A/D conversion is completed. If YES in step 201, the flow advances to step 202 to load the A/D conversion result from the A/D converter 91 to the register A in the CPU 90'. In step 203, the value of the register A is also stored in the register D without any change. The CPU 90' determines in step 204 whether the value of the register D is a positive or negative value. If the value is determined to be a positive value, the flow advances to step 206. However, if the value is determined to be a negative value, the sign of the value is inverted and the inverted value is set in the register D in step 205. The flow then advances to step 206. In step 206, a value obtained by multiplying the values of the registers $b_1$ and $W_0$ with each other is subtracted from the A/D conversion value stored in the register A. The difference is then stored in the register $W_0$. A value obtained by multiplying $a_1$ with $W_1$ is added to a value obtained by multiplying $a_1$ with $W_0$, and the sum is then stored in the register A. The value of the register $W_0$ is updated to $W_1$. In step 207, the memory data M(D) prestored in accordance with the value of the register D is transferred to the register K. The value of the memory data M(D) is increased with an increase in the value D.

In step 208, the A/D conversion result in the register A is multiplied with the value of the register K, and the product is then stored in the register A. In step 209, this value in the register A is output to the D/A converter 92. In step 210, the D/A converter 92 starts D/A conversion in accordance with a control signal input from the CPU 90'. The CPU 90' then determines in step 211 whether D/A conversion is completed. If YES in step 211, the flow returns to step 200. Since an output from the D/A converter 92 is connected to the drive unit C, a current proportional to the output from the D/A converter 92 is supplied to the coil 24.

As described above, a proportional coefficient value to be added to the driver unit C is selectively changed in accordance with the value of the difference signal (Va−Vb). That is, the viscous constant of the sensor is increased when the sensor output (i.e., the difference signal (Va−Vb)) is increased, i.e., when the relative displacement between the outer cylinder 21 and the buoyant member 22 is increased.

According to the fourth to sixth embodiments described above, a current proportional to the differential value of the relative displacement between the buoyant member 22 and the outer cylinder 21, i.e., proportional to the relative velocity is supplied to the coil 24 to electrically generate a sensor viscous force. The proportional constant is nonlinearly increased when the displacement output from the sensor is increased. The viscous force of the sensor is nonlinearly and abruptly increased when the relative displacement between the outer cylinder 21 and the buoyant member 22 is increased. The rise stabilizing time can be greatly shortened without degrading the sensor characteristics. Therefore, the camera shutter time lag can be shortened.

In each of the above embodiments, the coil 24 is used as an electromagnetic force generation member. If an electromagnetic force is generated by energization control, the electromagnetic force generating member is not limited to the coil 24.

In each of the above embodiments, the electromagnetic force for controlling the relative displacement between the buoyant member 22 and the outer cylinder 21 is nonlinearly increased when the relative displacement is increased. However, this change in electromagnetic force can be changed in accordance with any nonlinear scheme as needed.

The respective embodiments described above exemplify angular displacement detection apparatuses. However, the present invention is also applicable to all vibration detection apparatuses for performing displacement detection, velocity detection, angular velocity detection, acceleration detection, and angular acceleration detection, and all apparatuses for detecting a relative moving state.

In each of the above embodiments, the buoyant member is arranged in a liquid. The movable member need not be located in a liquid if the movable member is moved relative to a holding unit.

What is claimed is:

1. A vibration detection apparatus having an outer case having a chamber in which a liquid is sealed, a movable member disposed within the liquid and rotatably held about a predetermined rotating shaft, and detecting means for detecting a relative angular displacement of said movable member and said outer case about said rotating shaft as a vibration signal, comprising:
   (A) electromagnetic means for controlling the relative angular displacement between said movable member and said outer case in accordance with an electromagnetic force; and
   (B) control means for nonlinearly changing the electromagnetic force of said electromagnetic means in accordance with the relative angular displacement between said movable member and said outer case.

2. An apparatus according to claim 1, wherein said control means comprises means for controlling a Lorenz force applied to said movable member by the electromagnetic force.

3. An apparatus according to claim 1, wherein said control means comprises means for nonlinearly changing the electromagnetic force of said electromagnetic means in accordance with a change in the relative angular displacement between said movable member and said outer case.

4. An apparatus according to claim 1, wherein said control means comprises means for nonlinearly and greatly changing the electromagnetic force of said electromagnetic means in accordance with a change in the relative angular displacement between said movable member and said outer case.

5. An apparatus according to claim 1, wherein said control means comprises means for changing an energization amount of said electromagnetic means.

6. An apparatus according to claim 1, wherein said control means comprises means for nonlinearly changing the electromagnetic force of said electromagnetic means so that a ratio of the relative angular displacement between said movable member and said outer case to the electromagnetic force varies in accordance with a change in the relative angular displacement.

7. An apparatus according to claim 1, wherein said control means comprises means for nonlinearly changing the electromagnetic force of said electromagnetic means so that a ratio of a differential value of the relative angular displacement between said movable member and said outer case to the electromagnetic force varies in accordance with a change in the relative angular displacement.

8. An apparatus according to claim 1, wherein said control means comprises means for changing the electromagnetic force of said electromagnetic means stepwise in accordance with a change in the relative angular displacement between said movable member and the outer case.

9. An apparatus according to claim 1, wherein said control means comprises means for changing a spring coefficient of a spring force generated due to an electromagnetic behavior of said electromagnetic means stepwise in accordance with a change in the relative angular displacement between said movable member and said outer case.

10. An apparatus according to claim 1, wherein said control means comprises means for changing a viscous coefficient of a viscous force generated due to an electromagnetic behavior of said electromagnetic means stepwise in accordance with a change in the relative angular displacement between said movable member and said case.

11. An apparatus according to claim 1, wherein said control means comprises means for continuously and nonlinearly changing the electromagnetic force of said electromagnetic means in accordance with a change in the relative angular displacement between said movable member and said outer case.

12. An apparatus according to claim 1, wherein said control means comprises means for nonlinearly and greatly changing the electromagnetic force of said electromagnetic means in accordance with change in the relative angular displacement between said movable member and said outer case.

13. An apparatus according to claim 1, wherein said control means comprises means for nonlinearly, continuously, and greatly changing a spring coefficient of a spring force generated due to electromagnetic behavior of said electromagnetic means in accordance with a change in the relative angular displacement between said movable member and said outer case.

14. An apparatus according to claim 1, wherein said control means comprises means for nonlinearly and continuously changing a spring coefficient of a spring force generated due to an electromagnetic behavior of said electromagnetic means in accordance with a change in the relative angular displacement between said movable member and said outer case.

15. An apparatus according to claim 1, wherein said control means comprises means for nonlinearly, continuously, and greatly changing a viscous coefficient of a viscous force generated due to an electromagnetic behavior of said electromagnetic means in accordance with a change in the relative angular displacement between said movable means and said outer case.

16. An apparatus according to claim 1, wherein said control means comprises means for nonlinearly and continuously changing a viscous coefficient of a viscous force generated due to an electromagnetic behavior of said electromagnetic means in accordance with a change in the relative angular displacement between said movable member and said outer case.

17. An apparatus for detecting a relative moving state, including:
   (A) means for sealing a liquid;
   (B) a movable member disposed within the liquid and movable together with the liquid relative to said sealing means;
   (C) means for detecting the relative moving state between said sealing means and said movable member;
   (D) electromagnetic means for controlling the relative movement between said sealing means and said movable member in accordance with an electromagnetic force; and
   (E) control means for nonlinearly changing the electromagnetic force of said electromagnetic means in accordance with the relative moving state between said sealing means and said movable member.

18. An apparatus according to claim 17, wherein said control means comprises means for controlling a Lorenz force applied to said movable member by the electromagnetic force.

19. An apparatus according to claim 17, wherein said control means comprises means for nonlinearly and greatly changing the electromagnetic force of said electromagnetic means in accordance with a change in the relative movement between said movable member and said sealing means.

20. An apparatus according to claim 17, wherein said control means comprises means for nonlinearly and greatly changing the electromagnetic force of said electromagnetic means in accordance with a change in the relative movement between said movable member and said sealing means.

21. An apparatus according to claim 17, wherein said control means comprises means for changing an energization amount of said electromagnetic means.

22. An apparatus according to claim 17, wherein said control means comprises means for changing a proportional coefficient, for changing the electromagnetic force of said electromagnetic means in proportion to the relative movement between said movable member and said sealing means, in accordance with the relative movement.

23. An apparatus according to claim 17, wherein said control means comprises means, for changing a proportional coefficient for changing the electromagnetic force of said electromagnetic means in proportion to a differential value of the relative movement between said movable member and said sealing means, in accordance with the relative movement.

24. An apparatus according to claim 17, wherein said control means comprises means for changing the electromagnetic force of said electromagnetic means stepwise in accordance with a change in the relative movement between said movable member and said sealing means.

25. An apparatus according to claim 17, wherein said control means comprises means for changing a spring coefficient of a spring force generated due to an electromagnetic behavior of said electromagnetic means stepwise in accordance with a change in the relative movement between said movable member and said sealing means.

26. An apparatus according to claim 17, wherein said control means comprises means for changing a viscous coefficient of a viscous force generated due to an electromagnetic behavior of said electromagnetic means stepwise in accordance with a change in the relative movement between said movable member and said sealing means.

27. An apparatus according to claim 17, wherein said control means comprises means for continuously and nonlinearly changing the electromagnetic force of said electromagnetic means in accordance with a change in the relative movement between said movable member and said sealing member.

28. An apparatus according to claim 17, wherein said control means comprises means for nonlinearly, continuously, and greatly changing the electromagnetic force of said electromagnetic means in accordance with a change in the relative movement between said movable member and said sealing means.

29. An apparatus according to claim 17, wherein said control means comprises means for nonlinearly, continuously, and greatly changing a spring coefficient of a spring force generated due to an electromagnetic behavior of said electromagnetic means in accordance with a change in the relative movement between said movable member and said sealing means.

30. An apparatus according to claim 17, wherein said control means comprises means for nonlinearly and continuously changing a spring coefficient of a spring force generated due to an electromagnetic behavior of said electromagnetic means in accordance with a change in the relative movement between said movable member and said sealing.

31. An apparatus according to claim 17, wherein said control means comprises means for nonlinearly, continuously, and greatly changing a viscous coefficient of a viscous force generated due to an electromagnetic behavior of said electromagnetic means in accordance with a change in the relative movement between said movable means and said sealing means 32. An apparatus according claim 17, wherein said control means comprises means for nonlinearly and continuously changing a viscous coefficient of a viscous force generated due to an electromagnetic behavior of said electromagnetic means in accordance with a change in the relative movement between said movable member and said sealing means.

33. An apparatus for detecting a relative moving state, comprising:
(A) a movable member;
(B) holding means for movably holding said movable member;
(C) means for detecting the relative moving state between said movable member and said holding means;
(D) electromagnetic means for controlling relative movement between said movable member and said holding means in accordance with an electromagnetic force; and
(E) control means for changing a proportional coefficient for changing the electromagnetic force of said electromagnetic means in proportion to a differential value of the relative movement between said movable member and said holding means in accordance with the relative movement.

34. An apparatus according to claim 33, wherein said control means comprises means for controlling a Lorenz force applied to said movable member by the electromagnetic force.

35. An apparatus according to claim 33, wherein said control means comprises means for nonlinearly changing the electromagnetic force of said electromagnetic means in accordance with a change in the relative movement between said movable member and said holding means.

36. An apparatus according to claim 33, wherein said control means comprises means for nonlinearly and greatly changing the electromagnetic force of said electromagnetic means in accordance with a change in the relative movement between said movable member and said holding means.

37. An apparatus according to claim 33, wherein said control means comprises means for changing an energization amount of said electromagnetic means.

38. An apparatus according to claim 33, wherein said control means comprises means for changing the electromagnetic force of said electromagnetic means stepwise in accordance with a change in the relative movement between said movable member and said holding means.

39. An apparatus according to claim 33, wherein said control means comprises means for changing a viscous coefficient of a viscous force generated due to an electromagnetic behavior of said electromagnetic means stepwise in accordance with a change in the relative movement between said movable member and said holding means.

40. An apparatus according to claim 33, wherein said control means comprises means for continuously and nonlinearly changing the electromagnetic force of said means in accordance with a change in the relative movement between said movable member and said holding means.

41. An apparatus according to claim 33, wherein said control means comprises means for nonlinearly, continuously, and greatly changing the electromagnetic force of said electromagnetic means in accordance with a change in the relative movement between said movable member and said holding means.

42. An apparatus according to claim 33, wherein said control means comprises means for nonlinearly, continuously, and greatly changing a viscous coefficient of a viscous force generated die to an electromagnetic behavior of said electromagnetic means in accordance with a change in the relative movement between said movable member and said holding means.

43. An apparatus according to claim 33, wherein said control means comprises means for nonlinearly and continuously changing a viscous coefficient of a viscous force generated due to an electromagnetic behavior of said electromagnetic means in accordance with a change in the relative movement between said movable member and said holding means is increased.

* * * * *

UNITED STATES PATENT AND TRADEMARK OFFICE
CERTIFICATE OF CORRECTION

PATENT NO. : 5,229,603
DATED : July 20, 1993
INVENTOR(S) : YASUHIKO SHIOMI

It is certified that error appears in the above-indentified patent and that said Letters Patent is hereby corrected as shown below:

<u>COLUMN 1</u>
Line 14, "like" should read --like.---.

<u>COLUMN 9</u>
Line 56, "thevalues" should read --the values--.

<u>COLUMN 12</u>
Line 3, "$W_0$" should read --$W_1$--.
Line 7, "$a_1$" should read --$a_0$--.

<u>COLUMN 16</u>
Line 7, "sealing." should read "sealing means.---.
Line 14, "means" should read --means.---.

<u>COLUMN 17</u>
Line 7, "means" should read --electromagnetic means--.

<u>COLUMN 18</u>
Line 14, "is increased" should be deleted.

Signed and Sealed this

Fourteenth Day of June, 1994

Attest:

BRUCE LEHMAN

*Attesting Officer*    *Commissioner of Patents and Trademarks*